United States Patent
Hosokawa

(10) Patent No.: US 10,897,213 B2
(45) Date of Patent: Jan. 19, 2021

(54) POWER CONVERTER AND DISTRIBUTED POWER SUPPLY SYSTEM

(71) Applicant: TABUCHI ELECTRIC CO., LTD., Osaka (JP)

(72) Inventor: Akihiko Hosokawa, Osaka (JP)

(73) Assignee: TABUCHI ELECTRIC CO., LTD., Osaka (JP)

(*) Notice: Subject to any disclaimer, the term of this patent is extended or adjusted under 35 U.S.C. 154(b) by 269 days.

(21) Appl. No.: 15/956,579

(22) Filed: Apr. 18, 2018

(65) Prior Publication Data
US 2018/0309387 A1   Oct. 25, 2018

(30) Foreign Application Priority Data

Apr. 19, 2017 (JP) ................... 2017-082596

(51) Int. Cl.
| | |
|---|---|
| H02M 7/537 | (2006.01) |
| H02J 3/38 | (2006.01) |
| H02M 1/02 | (2006.01) |
| H02S 40/32 | (2014.01) |
| H02M 7/48 | (2007.01) |
| H02M 1/32 | (2007.01) |
| H02J 7/35 | (2006.01) |

(52) U.S. Cl.
CPC .............. H02M 7/537 (2013.01); H02J 7/35 (2013.01); H02M 1/02 (2013.01); H02M 1/32 (2013.01); H02M 7/48 (2013.01); H02S 40/32 (2014.12)

(58) Field of Classification Search
CPC .......... H02M 7/537; H02M 7/48; H02M 1/02; H02J 3/383; H02J 7/35
See application file for complete search history.

(56) References Cited

U.S. PATENT DOCUMENTS

2017/0288403 A1*  10/2017  Lung .................... H03H 7/0115
2018/0309299 A1*  10/2018  Moriyama ....... G01R 19/16509

FOREIGN PATENT DOCUMENTS

| JP | H09-271141 A | 10/1997 |
|---|---|---|
| JP | 2001-238464 A | 8/2001 |
| JP | 2016-127625 A | 7/2016 |
| JP | 2017-22884 A | 1/2017 |
| JP | 2017022884 A * | 1/2017 |

OTHER PUBLICATIONS

Transnational of JP2017022884 (Year: 2017).*
General Rules of Test Method for Grid Interconnection Protection Device etc. for Compact Dispersed Power Generation System, JETGR0002-1-6.1, Oct. 2015, Japan Electrical Safety & Technology Laboratories.

* cited by examiner

*Primary Examiner* — Rexford N Barnie
*Assistant Examiner* — Elim Ortiz
(74) *Attorney, Agent, or Firm* — Maschoff Brennan

(57) ABSTRACT

A power converter includes: an inverter converting DC power to AC power and outputting the AC power to first and second voltage terminals of a connection terminal unit; and switches RC. The switches RC include a first protection switch provided to a first line connecting the inverter and the first voltage terminal together, a second protection switch provided to a second line connecting the inverter and the second voltage terminal together, and a voltage switch connected in series between the second line and a neutral terminal. A load connection terminal is connected to a line connecting between the first line and the voltage switch.

7 Claims, 12 Drawing Sheets

POWER CONVERTER AND DISTRIBUTED POWER SUPPLY SYSTEM

CROSS-REFERENCE TO RELATED APPLICATION

This application claims priority to Japanese Patent Application No. 2017-082596 filed on Apr. 19, 2017, the entire disclosure of which is incorporated by reference herein.

BACKGROUND

The present disclosure relates to a power converter, and a distributed power supply system including the power converter and a distributed power supply such as a photovoltaic (PV) power generator.

Nowadays, distributed power supplies such as PV power generators have been widely used, and those non-utility power facilities and their associated parts are more and more often connected to utility power grids. Such a distributed power supply is connected to a utility power grid during a normal operation in which an electric power is supplied from the utility power grid. It has been well-known to, during interruption of a utility power grid, disconnect a power converter from the grid to supply a power from a distributed power supply to an independent load or an independent outlet, i.e., a technique of switching the operation to a grid independent operation.

Japanese Unexamined Patent Publication No. 2017-22884 discloses a technique of enabling an independent operation by providing a relay (switch) between a power conditioner and a pole transformer (grid), a relay between a power conditioner and an important load (independent load), and a relay between a pole transformer (grid) and an important load (independent load).

The Japan Electric Association, General Rule of Testing Method of Grid-interconnection Protection Device for Small Distributed Power Generation System and Other Devices, JETGR0002-1-6. 1 (2015) (page 31) discloses that, during in the grid independent operation, there are two disconnection points that can be mechanically closed/opened in order to prevent a reverse charge into a grid and non-synchronous input with a grid.

SUMMARY

However, as disclosed in Japanese Unexamined Patent Publication No. 2017-22884, providing a relay between a power conditioner and a grid, a relay between the power conditioner and a load, and a relay between the grid and the load results in a large number of relays, which is a problem. Specifically, failure detection circuits need to be attached to the respective relays utilized for grid interconnection. Therefore, increasing the number of relays allows the failure detection circuits to have a complicated configuration. Thus, in order to reduce costs and ensure safety, it is required to reduce the number of the relays as much as possible.

The present disclosure is conceived in view of the above problems, and intends to provide a power converter capable of performing a grid independent operation and having switches with improved configurations.

A power converter according to one aspect of the present disclosure includes: an inverter converting DC power to AC power and outputting the AC power to a pair of first and second lines; a connection terminal unit having a first voltage terminal connected to the first line, a second voltage terminal connected to the second line, and a neutral terminal; a first protection switch disposed in the first line; a second protection switch disposed in the second line; first and second voltage switches connected together in series between the second line and the neutral terminal; and load connection terminals, one of which is connected to the first line, and the other of which is connected to a line connecting the first and second voltage switches together.

The present disclosure can supply different voltages from a grid to a load connection terminal, and enables a grid independent operation.

DETAILED DESCRIPTION

An embodiment of the present disclosure will now be described in detail with reference to the drawings. The following description of a preferred embodiment is only an example in nature, and is not intended to limit the scope, applications or use of the present invention.

<Configuration of Distributed Power Supply System>

Figure 1:
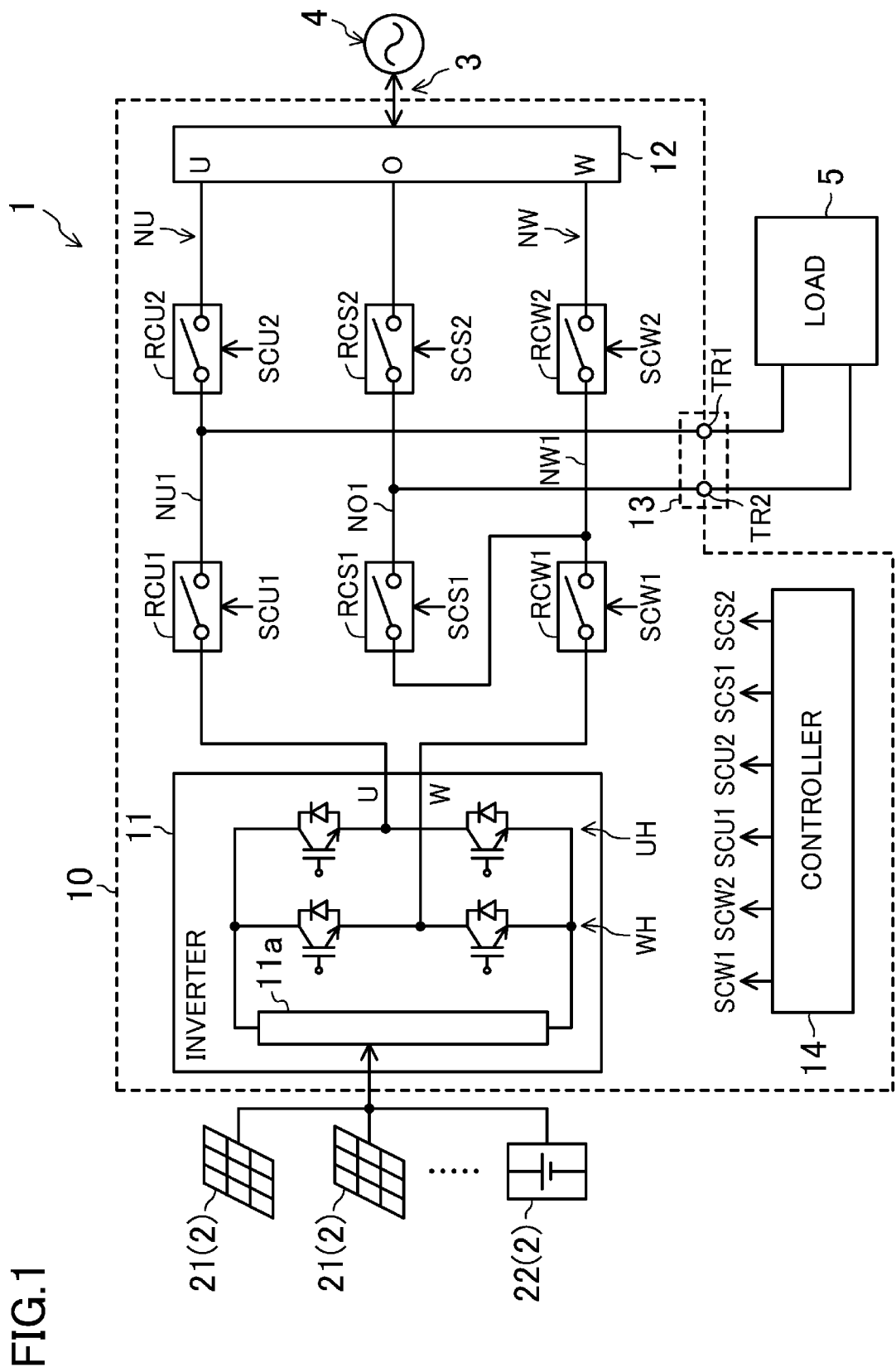
FIG. 1 illustrates an exemplary overall configuration of a distributed power supply system according to an embodiment.

FIG. 1 illustrates an exemplary overall configuration of a distributed power supply system according to the embodiment.

This distributed power supply system 1 includes a plurality of distributed power supplies 2, 2, . . . , and a power converter 10 connecting the plurality of distributed power supplies 2, 2, . . . , to a utility power grid 4 (hereinafter simply referred to as "grid" 4) through a transmission line 3, and an independent load 5 serving as an independent operation unit. FIG. 1 illustrates an example in which the plurality of distributed power supplies 2, 2, . . . , include a plurality of photovoltaic power generators 21, 21, . . . , and a storage battery 22. In this embodiment, the grid 4 is supposed to be a single-phase three-wire grid.

The power converter 10 includes an inverter 11 converting direct current (DC) power supplied from the distributed power supplies 2, 2, . . . , to alternating current (AC) power, a terminal unit 12 closer to the grid (hereinafter referred to as "the grid-side terminal unit 12") serving as a connection terminal to which the transmission line 3 is connected, a terminal unit 13, closer to the independent load, (hereinafter referred to as "the load-side terminal unit 13") to which the independent load is connected, a plurality of switches RC, and a controller 14. In FIG. 1, the plurality of switches RC include a U-phase output protection switch RCU1 serving as a first output protection switch, a U-phase grid protection switch RCU2 serving as a first grid protection switch, a W-phase output protection switch RCW1 serving as a second output protection switch, a W-phase grid protection switch RCW2 serving as a second grid protection switch, a first voltage switch RCS1, and a second voltage switch RCS2.

The inverter 11 includes a power converter unit 11a connected to the distributed power supplies 2, 2, . . . , and a U-phase half-bridge circuit UH and a W-phase half-bridge circuit WH that are connected in a stage following the power converter unit.

The power converter unit 11a is a circuit supplying a DC voltage associated with the output voltage of the inverter 11 to the U-phase half-bridge circuit UH and the W-phase half-bridge circuit WH. The power converter unit 11a includes, e.g., a DC/DC converter (not shown) which will be controlled by the controller 14. The DC/DC converter may be provided to a position closer to the distributed power supplies 2, 2, . . . .

The grid-side terminal unit 12 is provided with a U terminal configured as a first voltage terminal, a W terminal configured as a second voltage terminal, and an O terminal configured as a neutral terminal. The grid-side terminal unit 12 may be provided with the U, W, and O terminals if its connection destination is a single-phase three-wire grid, and its specific configuration is not particularly limited. For example, the grid-side terminal unit 12 may be comprised of a simple electronic component(s) such as a terminal block, a changeover switch, or a connector, or may be comprised of a terminal or an interconnect(s) formed on a circuit substrate (not shown) mounted in the power converter 10, or electronic components, such as a terminal block and a connector, mounted to such a circuit substrate, though its specific illustration is omitted.

A U terminal to which an output of the U-phase half-bridge circuit UH of the inverter 11 is connected (hereinafter referred to as "the U terminal of the inverter 11") and the U terminal of the grid-side terminal unit 12 are connected together by a U-phase line NU (configured as a first line). The U-phase line NU is provided with the U-phase output protection switch RCU1 and the U-phase grid protection switch RCU2 that are connected together in series.

Likewise, a W terminal to which an output of the W-phase half-bridge circuit WH of the inverter 11 is connected (hereinafter referred to as "the W terminal of the inverter 11") and the W terminal of the grid-side terminal unit 12 are connected together by a W-phase line NW (configured as a second line). The W-phase line NW is provided with the W-phase output protection switch RCW1 and the W-phase grid protection switch RCW2 that are connected together in series The U-phase output protection switch RCU1 and the W-phase output protection switch RCW1 are switches for protecting the output of the inverter 11. The U-phase grid protection switch RCU2 and the W-phase grid protection switch RCW2 are switches for protecting the grid. The U-phase output protection switch RCU1 is disposed closer to the inverter 11, and the U-phase grid protection switch RCU2 is disposed closer to the grid. The W-phase output protection switch RCW1 is disposed closer to the inverter 11, and the W-phase grid protection switch RCW2 is disposed closer to the grid.

A W-phase intermediate line NW1, connecting between the W-phase output protection switch RCW1 and the W-phase grid protection switch RCW2, and the O terminal of the grid-side terminal unit 12 are connected together through the first voltage switch RCS1 and the second voltage switch RCS2 which are connected together in series. The first voltage switch RCS1 is disposed closer to the W-phase intermediate line NW1, and the second voltage switch RCS2 is connected at a position closer to the O terminal of the grid-side terminal unit 12. In the present disclosure, the term "connect" means including not only direct connection but also indirect connection through, e.g., an active element, a passive element, and an electronic component. The W-phase intermediate line NW1 constitutes a part of the W-phase line NW.

The load-side terminal unit 13 is provided with first and second load terminals TR1 and TR2 serving as load connection terminals. The first load terminal TR1 is connected to a U-phase intermediate line NU1 connecting between the U-phase output protection switch RCU1 and the U-phase grid protection switch RCU2. The second load terminal TR2 is connected to an O-phase intermediate line NO1 connecting between the first voltage switch RCS1 and the second voltage switch RCS2. The load-side terminal unit 13 may be provided with the load connection terminals (the first and second load terminals TR1 and TR2 in this embodiment), and its specific configuration is not particularly limited. For example, the load-side terminal unit 13 may be comprised of a simple electronic component such as an independent outlet, or a terminal block for independent load or may be comprised of a terminal or an interconnect formed on a circuit substrate (not shown) mounted in the power converter 10, or electronic components, such as a terminal block and a connector, mounted to such a circuit substrate, though its specific illustration is omitted.

The load-side terminal unit 13 is connected to the independent load 5. Examples of the independent load 5 include electric home appliances such as a refrigerator and lighting which are required to be continuously used even during power failure. In this case, the independent load 5 can be operated not only during an normal operation in which an electric power is supplied from the grid 4 but also during a grid independent operation in which the inverter 11 is disconnected from the grid 4 due to, e.g., power failure. The independent load 5 may be a load exclusively used during the grid independent operation, i.e., not used during the normal operation.

A conducting path starting from the U terminal of the inverter 11, passing through the U-phase output protection switch RCU1 and the U-phase grid protection switch RCU2, and reaching the U terminal of the grid-side terminal unit 12, and a conducting path starting from the W terminal of the inverter 11, passing through the W-phase output protection switch RCW1 and the W-phase grid protection switch RCW2, and reaching the W terminal of the grid-side terminal unit 12 are collectively referred to as a first conducting path EL1. Likewise, a conducting path starting from the U terminal of the grid-side terminal unit 12 and reaching the first load terminal TR1 of the load-side terminal unit 13, and a conducting path starting from the W terminal of the grid-side terminal unit 12 and reaching the second load terminal TR2 of the load-side terminal unit 13 are collectively referred to as a second conducting path EL2 (see the bold line of FIG. 4). Also, a conducting path starting from the U terminal of the grid-side terminal unit 12 and reaching the first load terminal TR1 of the load-side terminal unit 13, and a conducting path starting from the O terminal of the grid-side terminal unit 12 and reaching the second load terminal TR2 of the load-side terminal unit 13 are collectively referred to as a third conducting path EL3 (see the bold line of FIG. 5). A conducting path starting from the U terminal of the inverter 11 and reaching the first load terminal TR1 of the load-side terminal unit 13, and a conducting path starting from the W terminal of the inverter 11 and reaching the second load terminal TR2 of the load-side terminal unit 13 are collectively referred to as a fourth conducting path EL4 (see the bold line of FIG. 6).

The controller 14 is configured as, e.g., a microcomputer, and has functions of controlling the inverter 11, and performing on-off control of each switch RC using an on-off control signal SRC.

In FIG. 1 and the following description, an on-off control signal outputting from the controller 14 to the U-phase output protection switch RCU1 is called "on-off control signal SCU1." Likewise, SCU2 is supposed to show the on-off control signal of the U-phase grid protection switch RCU2. SCW1 is supposed to show the on-off control signal of the W-phase output protection switch RCW1. SCW2 is supposed to show the on-off control signal of the W-phase grid protection switch RCW2. SCS1 is supposed to show the on-off control signal of the first voltage switch RCS1. SCS2 is supposed to show the on-off control signal of the second voltage switch RCS2.

If the on-off control signals SCU1, SCU2, SCW1, SCW2, SCS1, and SCS2 are collectively called or they are not distinguished from one another, they are supposed to be called "the on-off control signal SRC." Likewise, if the switches RCU1, RCU2, RCW1, RCW2, RCS1, and RCS2 are collectively called or they are not distinguished from one another, each of them is supposed to be called "the switch RC."

In the following description, "the controller 14 interrupts the switch RC" means that the controller 14 opens the switch RC using the on-off control signal SRC to cause the conducting path (line) to be in a non-conductive state. Likewise, "the controller 14 conducts the switch RC" means that the controller 14 closes the switch RC using the on-off control signal SRC to cause the conducting path (line) to be in a conductive state.

<Operation of Power Converter Device (Operation of Switch)>

It will be described in detail how the controller 14 opens/closes each switch RC in each operation condition of the distributed power supply system 1, with reference to FIGS. 2 to 6. In the following description, the grid 4 is supposed to be a single phase three wire system (the supply voltage from the grid is 100 V class or 200 V class). The supply voltage of the grid 4 that is a target to be connected to the power converter 10 according to the present disclosure is not limited to the 100 V class or 200 V class. Alternatively, that may be another voltage value. In this case, the device can also be operated in the same or similar manner as or to the device in the following description.

(1) During Normal Operation (Load Compatible with 200 V)

First, the operation of the power converter 10 will be specifically described with reference to FIG. 2 during a normal operation in which an electric power of 200 V class is supplied from the grid 4 and the inverter 11 is operated (for example, in a case where reverse power flow from the distributed power supplies 2, 2, . . . to the grid 4 is observed). The independent load 5 is supposed to be compatible with the input voltage of 200 V class.

Figure 2:
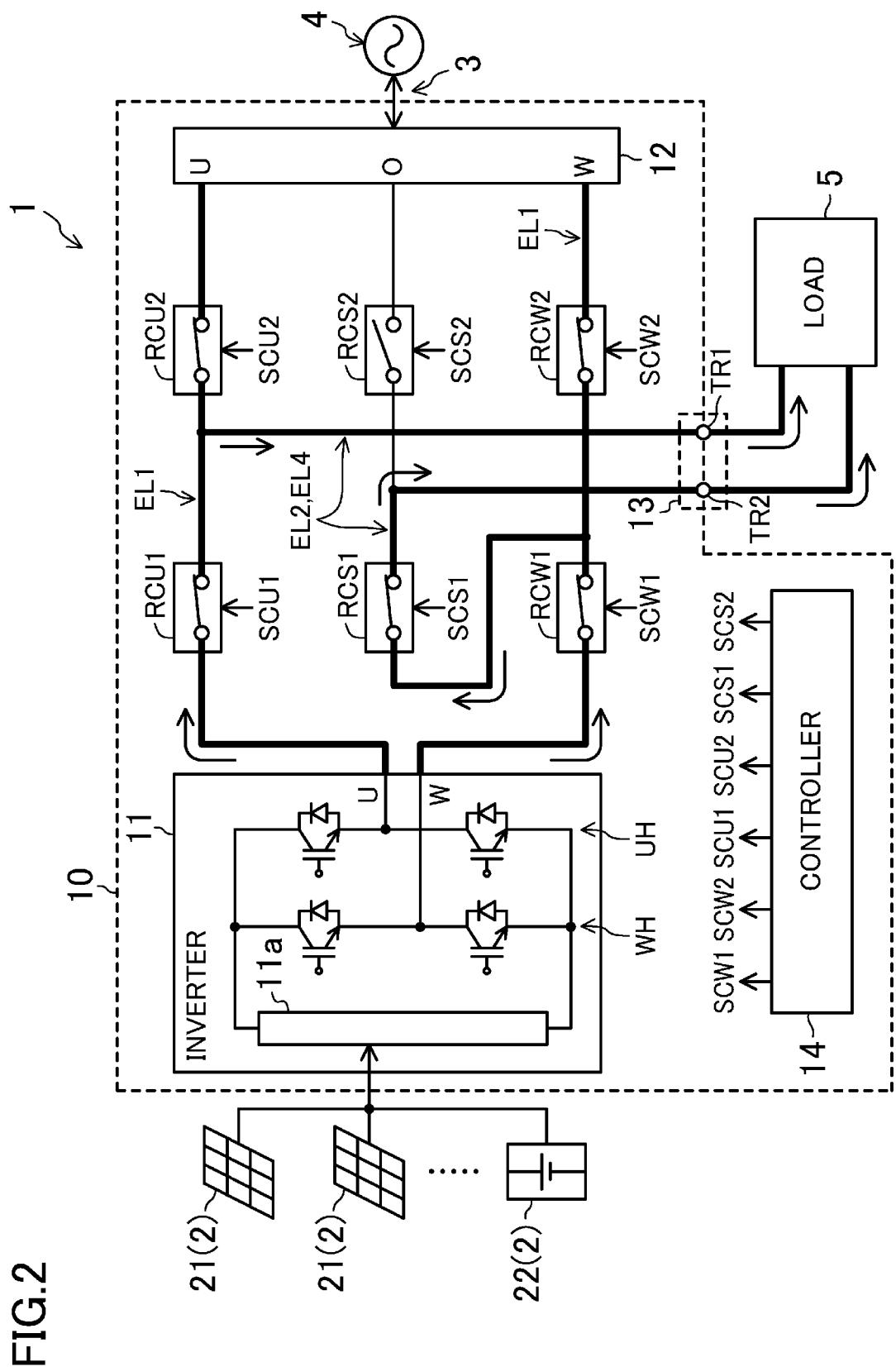
FIG. 2 illustrates how to operate a power converter (a switch).

The controller 14 controls the inverter 11 such that the output voltage from the U and W terminals of the inverter 11 is 200 V Next, the controller 14, as shown in FIG. 2, causes the U-phase output protection switch RCU1, the U-phase grid protection switch RCU2, the W-phase output protection switch RCW1, and the W-phase grid protection switch RCW2 to be in a conductive state. This causes the first conducting path EL1 connecting between the U terminal of the inverter 11 and the U terminal of the grid-side terminal unit 12, and between the W terminal of the inverter 11 and the W terminal of the grid-side terminal unit 12 to conduct (see the bold line of FIG. 2). As a result, if the output voltage supplied from the distributed power supplies 2, 2, . . . , and output from the inverter 11 exceeds the voltage of the grid 4, reverse power flow of the output voltage from the inverter 11 to the grid 4 through the first conducting path EL1 and the grid-side terminal unit 12 is observed.

Furthermore, the controller 14 allows the first voltage switch RCS1 to conduct and the second voltage switch RCS2 not to conduct. This allows the output from the U terminal of the inverter 11 and the input which the U terminal (grid) of the grid-side terminal unit 12 has received to be added together, such that they are supplied to the first load terminal TR1. Likewise, the output from the W terminal of the inverter 11 and the input which the W terminal (grid) of the grid-side terminal unit 12 has received are added together, such that they are supplied to the second load terminal TR2. That is to say, this causes the second and fourth conducting paths EL2 and EL4 to be in a conductive state, the second conducting path EL2 connecting between the U terminal of the grid-side terminal unit 12 and the first load terminal TR1 and between the W terminal of the grid-side terminal unit 12 and the second load terminal TR2, the fourth conducting path EL4 connecting between the U terminal of the inverter 11 and the first load terminal TR1 and between the W terminal of the inverter 11 and the second load terminal TR2. The independent load 5 is supplied with a voltage of 200 V (see the bold line of FIG. 2).

(2) During Normal Operation (Load Compatible with 100 V)

Next, the operation of the power converter 10 will be specifically described with reference to FIG. 3 during the same or similar normal operation as or to the normal operation in the above description (1) except that the load corresponds to the input voltage of 100 V class.

First, the controller 14 controls the inverter 11 such that the output voltage between the U and W terminals of the inverter 11 is 200 V.

Next, the controller 14, just like in the above description (1), allows the U-phase output protection switch RCU1, the U-phase grid protection switch RCU2, the W-phase output protection switch RCW1, and the W-phase grid protection switch RCW2 to be in a conductive state. This causes the first conducting path EL1 to be in a conductive state (see the bold line of FIG. 3), and reverse power flow of an electric power corresponding to the difference between the output voltage of the distributed power supplies 2, 2, . . . , and the voltage of the grid 4 becomes observed from the distributed power supplies 2, 2, . . . , to the grid 4.

Figure 3:
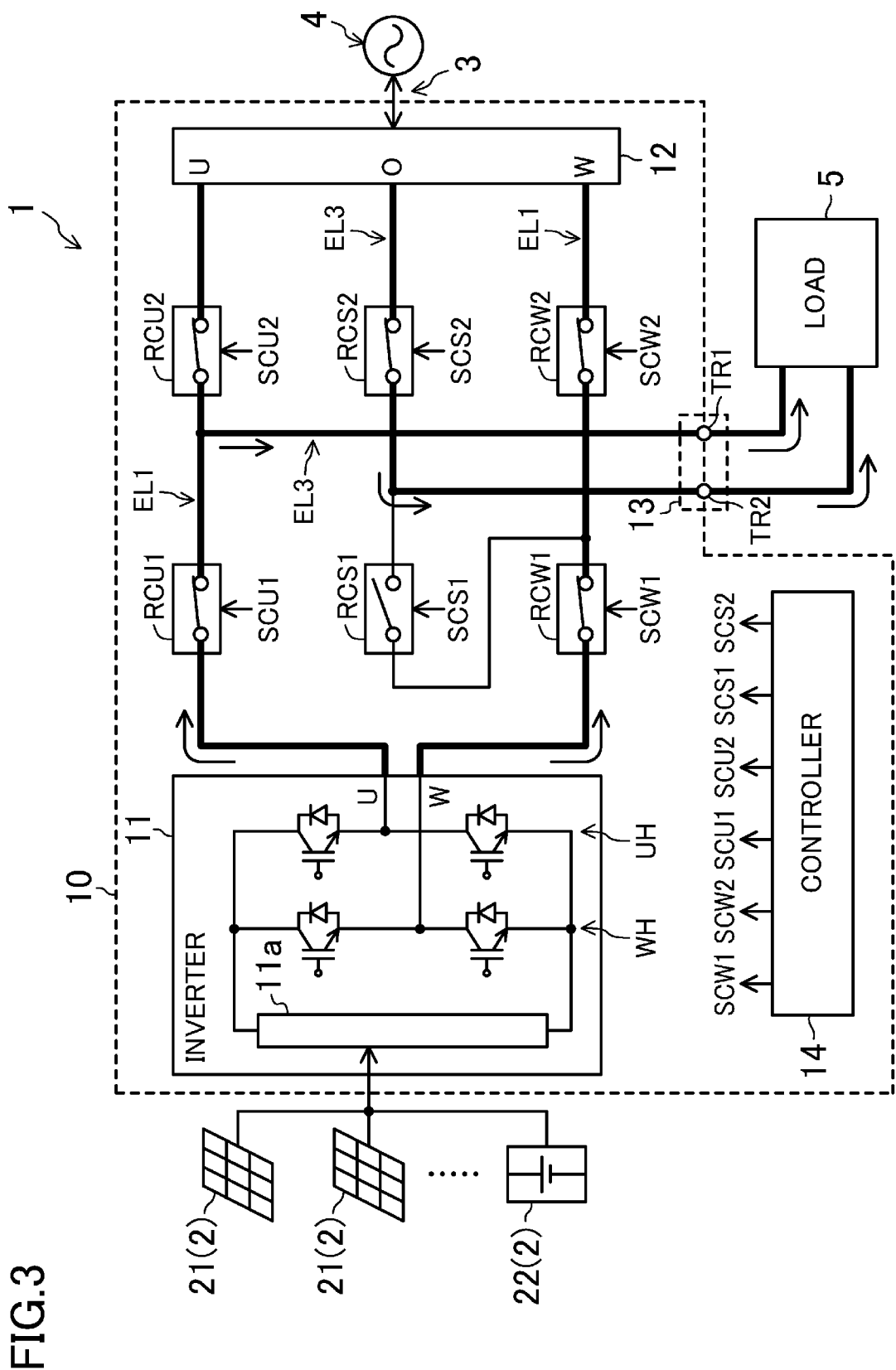
FIG. 3 illustrates how to operate the power converter (the switch).

As shown in FIG. 3, the controller 14 further allows the second voltage switch RCS2 to conduct and the first voltage switch RCS1 not to conduct. This causes the third conducting path EL3 to conduct, the third conducting path EL3 connecting between the U terminal of the grid-side terminal unit 12 to first load terminal TR1 and between the O terminal of the grid-side terminal unit 12 and the second load terminal TR2. The independent load 5 is supplied with a voltage of 100 V (see the bold line of FIG. 3).

(3) During Disconnection of Inverter (Load Compatible with 200 V)

Next, the operation of the power converter 10 will be specifically described with reference to FIG. 4 in a situation where the inverter 11 is disconnected from the grid 4. The power converter 10 will be operated as follows when the controller 14 stops the operation of the inverter 11 in, e.g., a situation where, due to nighttime, rain, or other causes, neither the photovoltaic power generators 21, 21, . . . , nor another power supply such as a storage battery 22 is provided with an electric power. The independent load 5 is supposed to be compatible with the input voltage of 200 V class.

Figure 4:
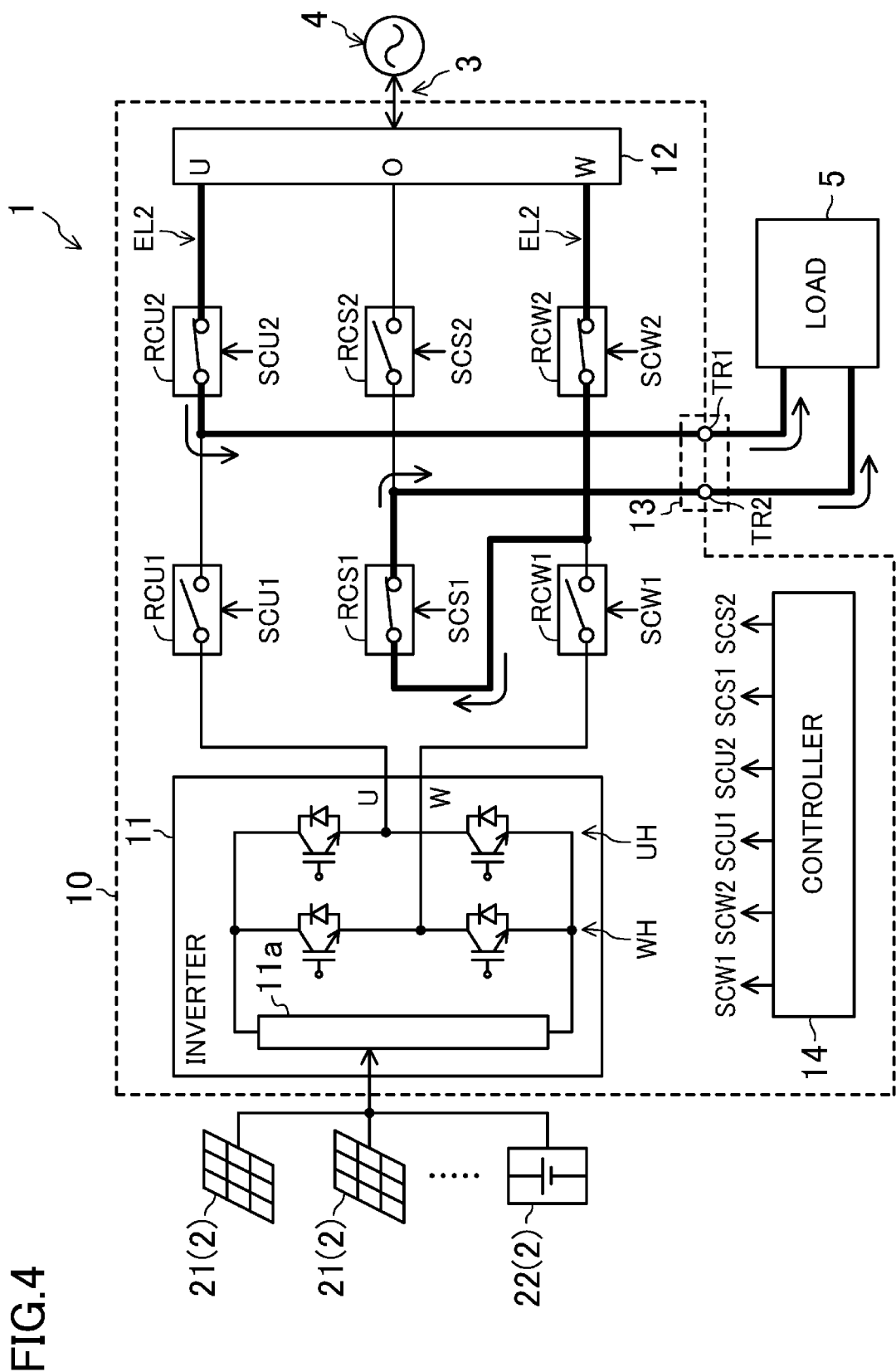
FIG. 4 illustrates how to operate the power converter (the switch).

First, the controller 14 stops the operation of the inverter 11, and as shown in FIG. 4, allows the U-phase output protection switch RCU1, the second voltage switch RCS2, and the W-phase output protection switch RCW1 to be in a non-conductive state, disconnecting the inverter 11 from the grid 4.

Next, the controller 14 causes the U-phase grid protection switch RCU2 to conduct, and the W-phase grid protection switch RCW2 and the first voltage switch RCS1 to conduct. This causes the second conducting path EL2 connecting between the U terminal of the grid-side terminal unit 12 and the first load terminal TR1 and between the W terminal of the grid-side terminal unit 12 and the second load terminal TR2 (see the bold line of FIG. 4).

(4) During Disconnection of Inverter (Load Compatible with 100V)

Next, just like in the above description (3), the operation of the power converter 10 will be specifically described with reference to FIG. 5 in a situation where the inverter 11 is disconnected from the grid 4 and the load is compatible with the input voltage of 100 V class.

First, just like in the above description (3), the controller 14 stops driving of the inverter 11. The controller 14 further causes the U-phase output protection switch RCU1, the first voltage switch RCS1, and the W-phase output protection switch RCW1 not to conduct, and disconnects the inverter 11 from the grid 4.

Figure 5:
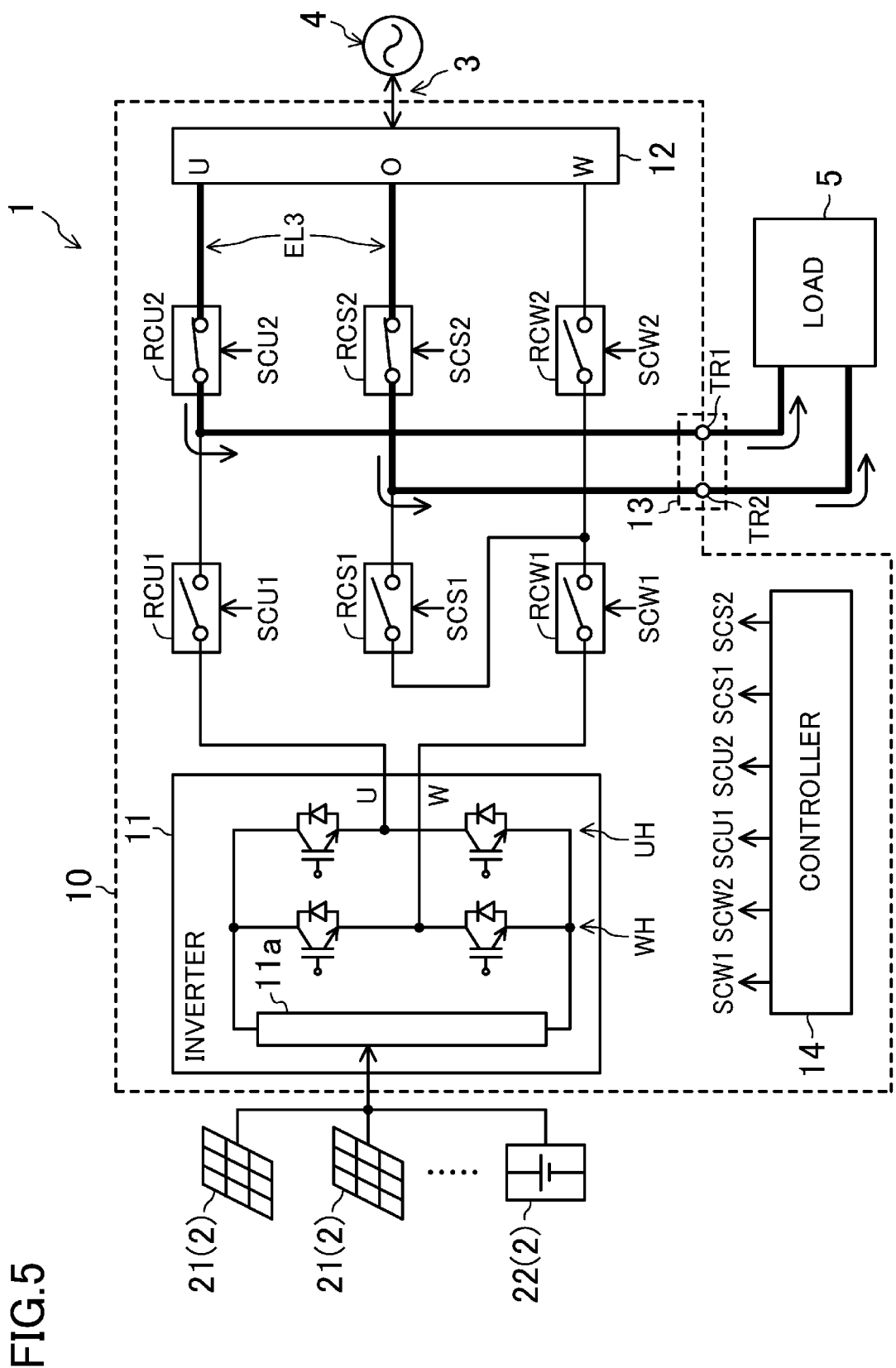
FIG. 5 illustrates how to operate the power converter (the switch).

Next, the controller 14, as shown in FIG. 5, allows the U-phase grid protection switch RCU2 the second voltage switch RCS2 to conduct. This causes the third conducting path EL3 to conduct, the third conducting path EL3 connecting between the U terminal of the grid-side terminal unit 12 and the first load terminal TR1 and between the O terminal of the grid-side terminal unit 12 and the second load terminal TR2 (see the bold line of FIG. 5). The W-phase grid protection switch RCW2 may conduct or may be interrupted. In FIG. 5, the controller 14 allows the W-phase grid protection switch RCW2 not to conduct.

(5) During Grid Independent Operation (Load Compatible with 100 V or 200 V)

Figure 6:
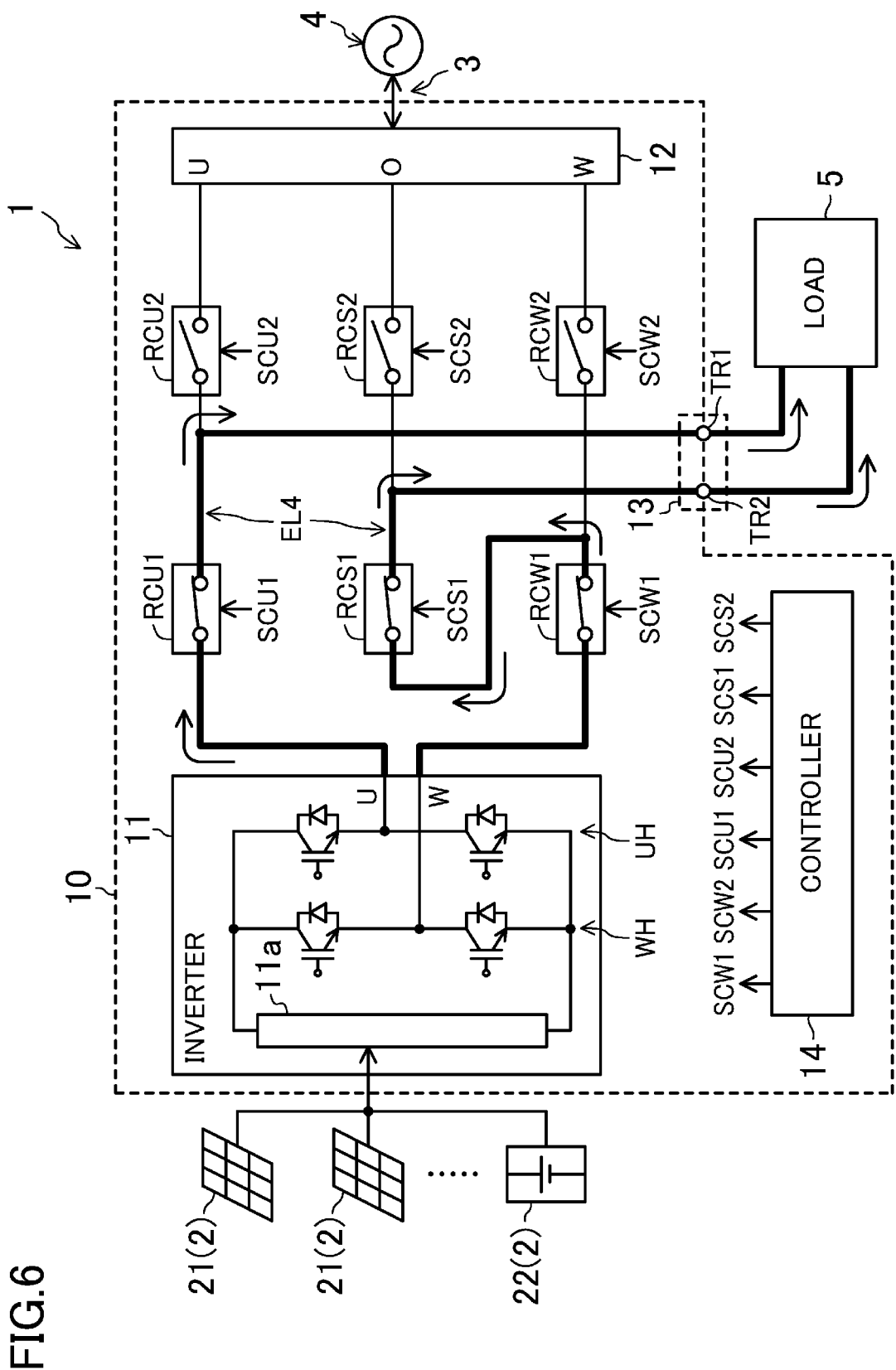
FIG. 6 illustrates how to operate the power converter (the switch).

Next, the operation of the power converter 10 will be specifically described during the grid independent operation of the inverter 11 with reference to FIG. 6. For example, the power converter 10 will be operated as follows in, e.g., a situation where electric power supply from the grid 4 is interrupted, due to, e.g., power failure.

First, if a voltmeter which is not shown detects that electric power supply from the grid 4 is stopped, the controller 14 opens the U-phase grid protection switch RCU2, the second voltage switch RCS2, and the W-phase grid protection switch RCW2 to disconnect the inverter 11 from the grid 4.

Next, the controller 14 causes the U-phase output protection switch RCU1 to conduct, and the W-phase output protection switch RCW1 and the first voltage switch RCS1 to conduct. This causes the fourth conducting path EL4 to conduct, the fourth conducting path EL4 connecting between the U terminal of the inverter 11 and the first load terminal TR1 between the W terminal of the inverter 11 and the second load terminal TR2 (see the bold line of FIG. 6).

During the grid independent operation, a load connected to the load-side terminal unit 13 may be compatible with 100 V class or may be compatible with 200 V class. Specifically, the controller 14 controls the inverter 11 such that the inverter 11 outputs a voltage corresponding to the independent load 5 which is to be connected to the load-side terminal unit 13.

As described above, according to the embodiment, at least two conducting paths of the first conducting path EL1, the second conducting path EL2, the third conducting path EL3, or the fourth conducting path EL4 share at least one of the switches RC. Specifically, when the inverter 11, the grid-side terminal unit 12, and the load-side terminal unit 13 are connected together, at least two conducting paths of the first conducting path EL1, the second conducting path EL2, the third conducting path EL3, or the fourth conducting path EL4 are connected together by allowing a part of these conducting paths to be common to each other (hereinafter referred to as "the common line"), and the switch RC is disposed in the common line. For example, the U-phase output protection switch RCU1 and the W-phase output protection switch RCW1 are disposed in a common line common to the first conducting path EL1 and the fourth conducting path EL4, i.e., the two conducting paths EL1 and EL4 share these switches RCU1 and RCW1. Likewise, the U-phase grid protection switch RCU2 is disposed in a common line common to the first, second, and third conducting paths EL1, EL2, and EL3. The W-phase grid protection switch RCW2 is disposed in the common line common to the first and second conducting paths EL1 and EL2. Further, the first voltage switch RCS1 is disposed in the common line common to the second and fourth conducting paths EL2 and EL4. As can be seen, the plurality of conducting paths shares at least one the switch RC, thereby making it possible to reduce the number of switches RC necessary for the power converter 10. Thus, this can provide the power converter 10 with an improved configuration of the switches RC.

In contrast, the technique disclosed in Japanese Unexamined Patent Publication No. 2017-22884 cannot supply a voltage of 200 V from a grid to an essential load (corresponding to the independent load 5 in the embodiment). That is to say, unlike the configuration of the present disclosure, this technique cannot supply different voltages from a grid to an essential load.

Figure 12:
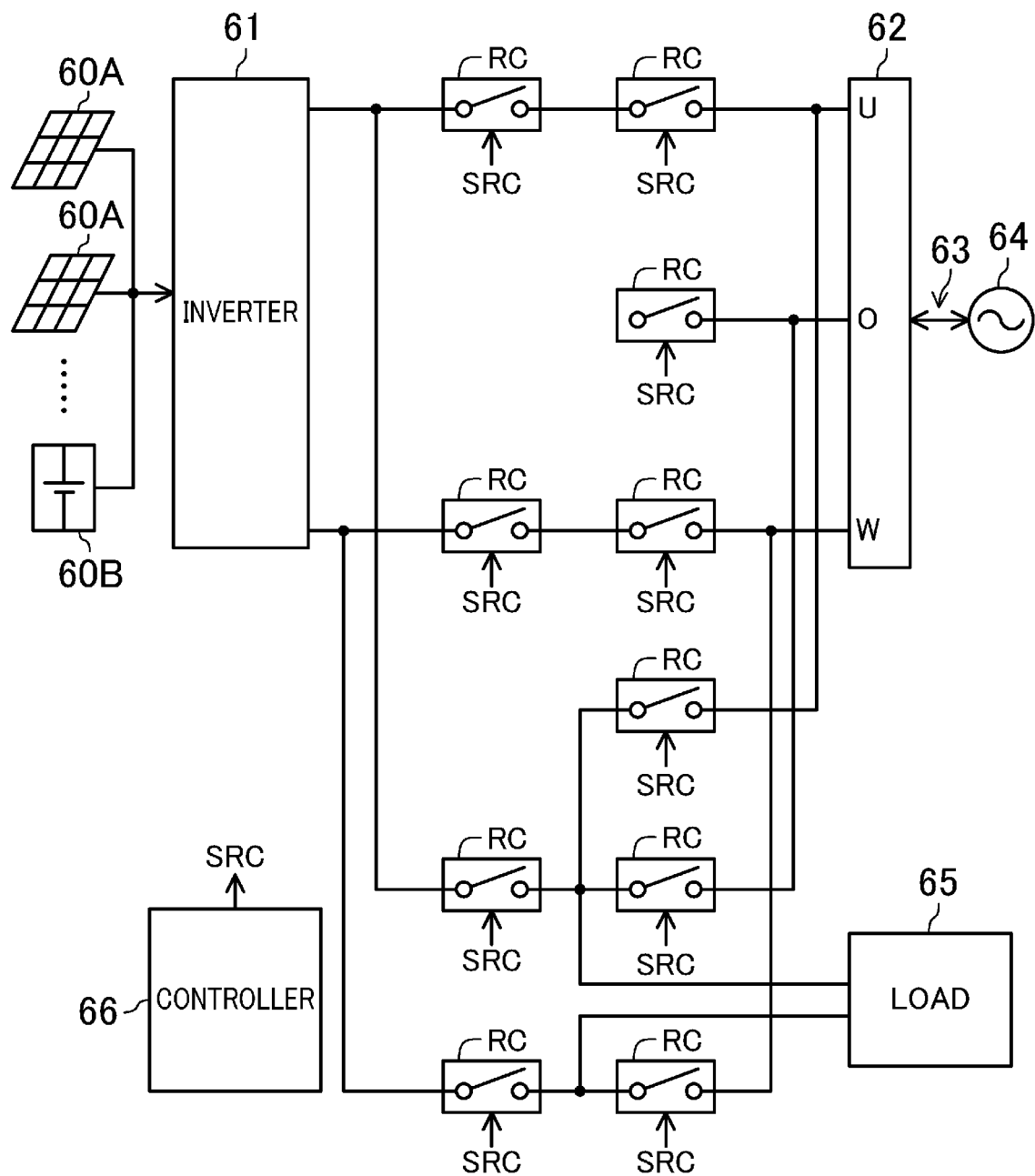
FIG. 12 illustrates an exemplary overall configuration of a distributed power supply system according to a comparative example.

Assuming that switches RC are disposed in each conducting path to perform connection to different voltages in a grid connection and perform a grid independent operation during, e.g., power failure, a configuration shown in FIG. 12 can be obtained. Here, switches RC are connected in series between an inverter 61 and a connection terminal 62 based on The Japan Electric Association, General Rule of Testing Method of Grid-interconnection Protection Device for Small Distributed Power Generation System and Other Devices, JETGR0002-1-6. 1 (2015) (page 31). Therefore, as shown in FIG. 12, ten switches are needed. In contrast, according to the embodiment, the necessary number of switches can be reduced to be about half. This can reduce costs of the components, and simplify the configuration of a failure detection circuit. In FIG. 12, reference characters 60A and 60B indicate a photovoltaic power generator and a storage battery. Reference characters 65 and 66 indicate an independent load and a controller, respectively.

<Variation of Embodiment>

The exemplary embodiment of the present disclosure has been described. However, the embodiment may be readily changed or modified in various manners. The following are some of those numerous variations of the present disclosure.

For example, in the above embodiment, the plurality of conducting paths share the U-phase output protection switch RCU1, the U-phase grid protection switch RCU2, the W-phase output protection switch RCW1, the W-phase grid protection switch RCW2, and the first voltage switch RCS1. However, this is only an exemplary embodiment of the present disclosure. For example, at least one of the switches RCU1, RCU2, RCW1, RCW2, or RCS1 may be the shared switch, and the rest of the switches may be disposed in each conducting path. This case can reduce the number of switches, compared with the configuration in which the switch RC is disposed in each conducting path as shown in FIG. 12. Increasing the number of the shared switch as shown in FIG. 1 can obtain an improved advantage. The number of switches RC may be reduced more significantly than that in FIG. 1 by, e.g., increasing the number of conducting paths sharing the shared switches.

The inverter 11, the grid-side terminal unit 12, and the load-side terminal unit 13 are connected together in a manner shown in FIG. 1. However, this is only an exemplary embodiment of the present disclosure. For example, these components may be connected together as shown in FIGS. 7 to 9.

Figure 7:
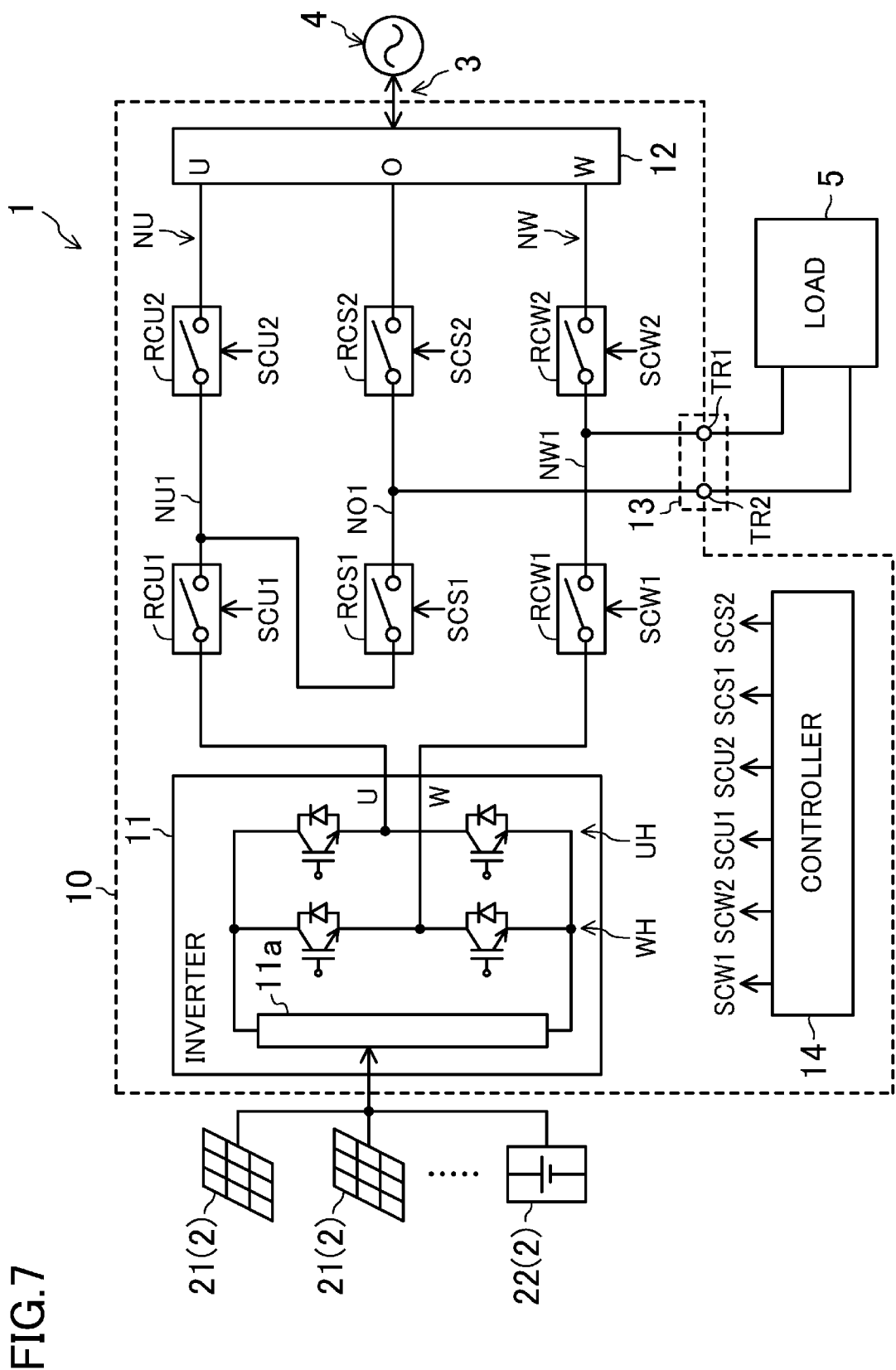
FIG. 7 illustrates another exemplary overall configuration of the distributed power supply system according to the embodiment.

Specifically, in FIG. 7, the first load terminal TR1 is connected to the W-phase intermediate line NW1 instead of the U-phase intermediate line NU1. A terminal of the first voltage switch RCS1 closer to the inverter 11 is connected to the U-phase intermediate line NU1 instead of the W-phase intermediate line NW1. In this case, the controller 14 performs on-off control of the switch RC as in the above embodiment, thereby obtaining the same or similar advantage as or to the embodiment.

Figure 8:
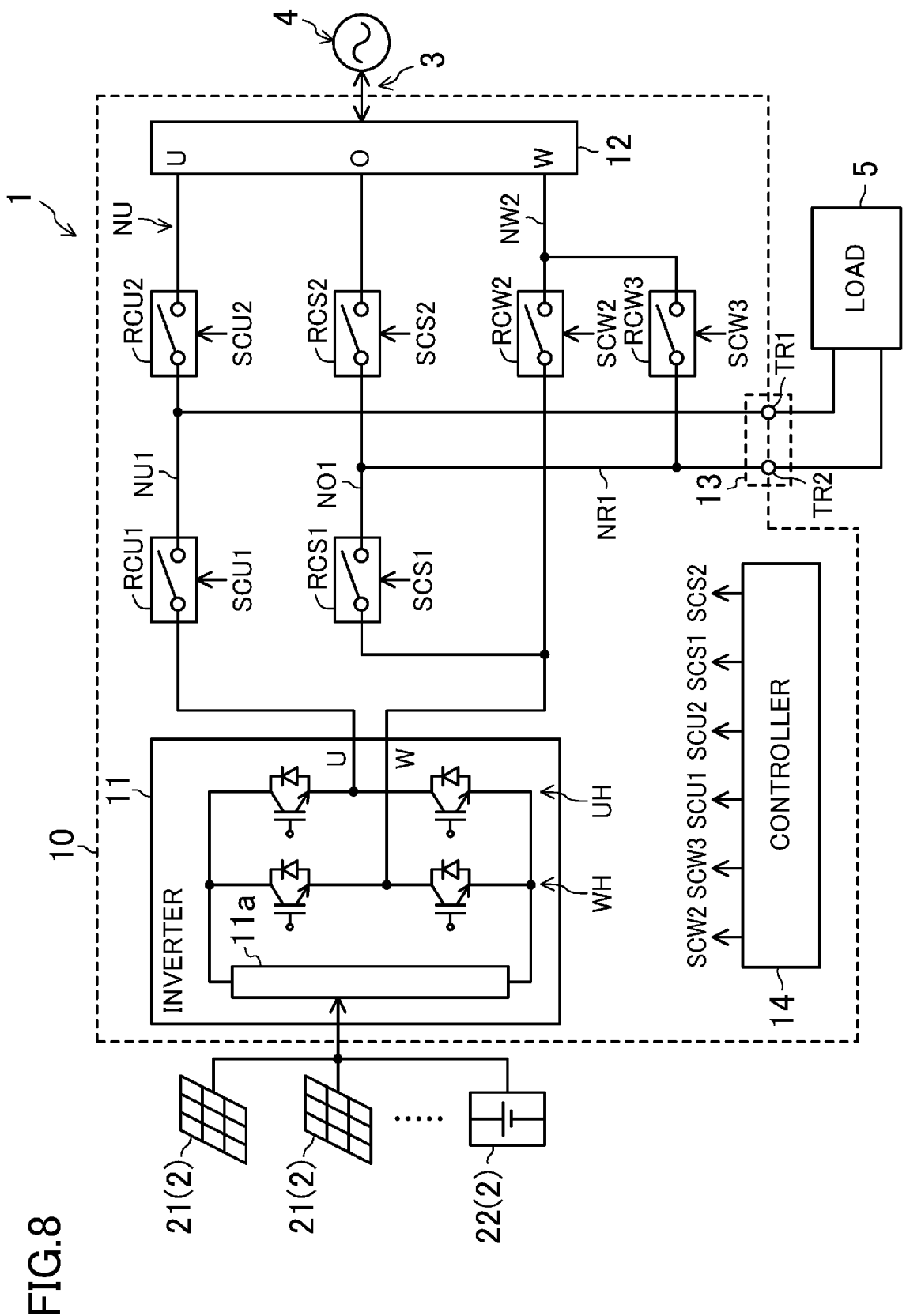
FIG. 8 illustrates another exemplary overall configuration of the distributed power supply system according to the embodiment.
Figure 9:
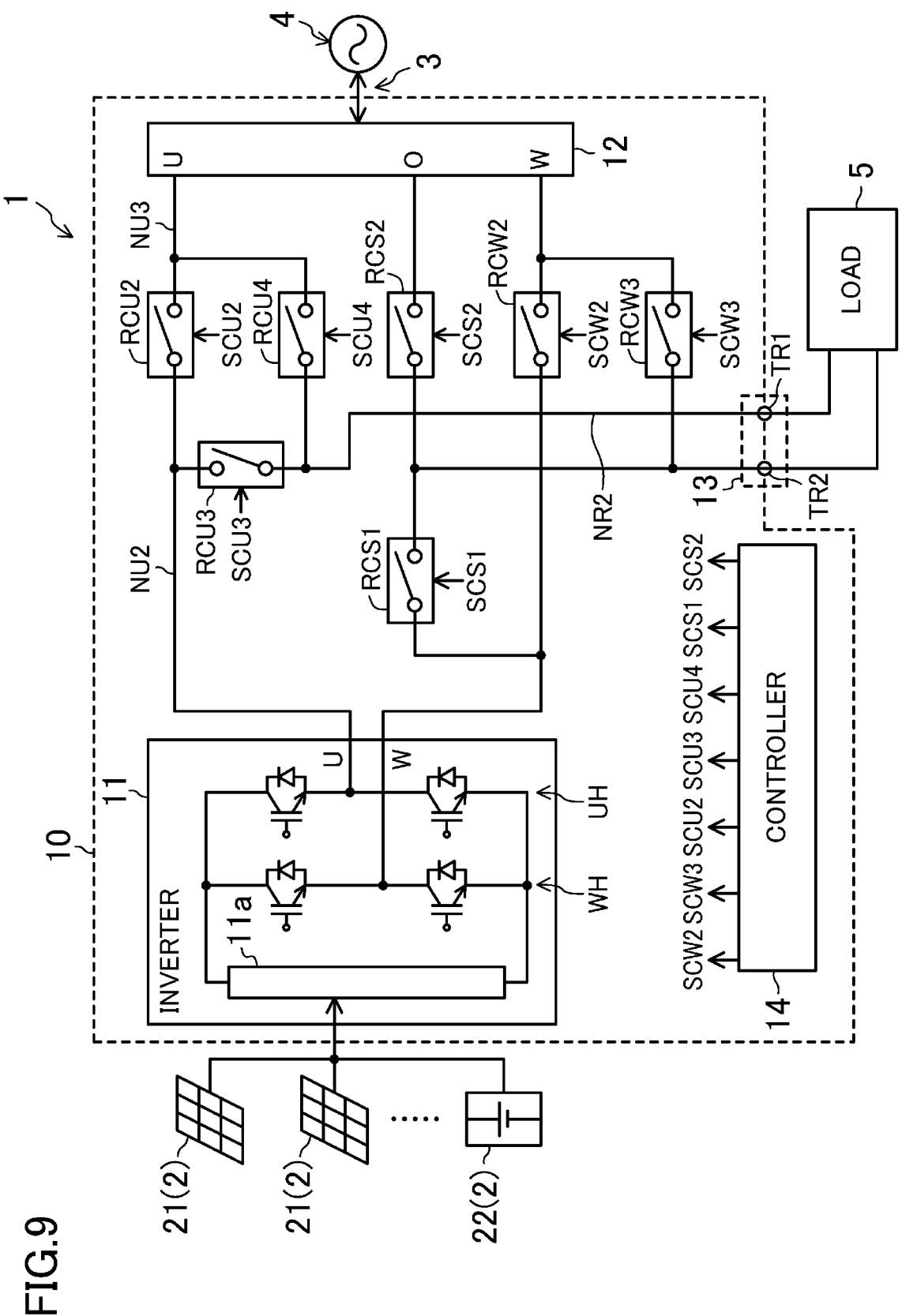
FIG. 9 illustrates another exemplary overall configuration of the distributed power supply system according to the embodiment.

In FIG. 8, the W-phase output protection switch RCW1 is omitted, and the W-phase protection switch RCW3 is added. The W-phase protection switch RCW3 has one terminal connected to the W-phase intermediate line NW2 connecting between the W-phase grid protection switch RCW2 and the W terminal of the grid-side terminal unit 12, and the other terminal connected to a line NR1 connecting between the O-phase intermediate line NO1 and the second load terminal TR2. The W-phase intermediate line NW2 constitutes a part of the W-phase line NW.

In the configuration of FIG. 8, the controller 14 may control each switch RC so as to cause the conducting path according to the operation state of the power converter 10 and the power supply state of the grid 4 to conduct. Specifically, in (3) During Disconnection of Inverter (Load Compatible with 200 V), the U-phase output protection switch RCU1, the first voltage switch RCS1, the second voltage switch RCS2, and the W-phase grid protection switch RCW2 are turned off to disconnect the inverter 11 from the grid 4. On the other hand, the U-phase grid protection switch RCU2, and the W-phase protection switch RCW3 are caused to conduct to connect the grid 4 and the load-side terminal unit 13 together. In (4) During Disconnection of Inverter (Load Compatible with 100V), the U-phase output protection switch RCU1, the first voltage switch RCS1, the W-phase grid protection switch RCW2, and the W-phase protection switch RCW3 are turned off to disconnect the inverter 11 from the grid 4. On the other hand, the U-phase grid protection switch RCU2, and the second voltage switch RCS2 are caused to conduct to connect the grid 4 and the load-side terminal unit 13 together. In (1) During Normal Operation (Load Compatible with 200 V), (2) During Normal Operation (Load Compatible with 100 V), and (5) During Grid Independent Operation, each switch RC may be controlled as in the above embodiment, and its specific description will be omitted. At that time, the W-phase protection switch RCW3 may be operated in the same or similar manner as or to the W-phase output protection switch RCW1.

In FIG. 9, in addition to the modification from FIG. 1 to FIG. 8, the U-phase output protection switch RCU1 is omitted, and the U-phase protection switches RCU3 and RCU4 are added. The U-phase protection switch RCU3 has one terminal connected to the U-phase intermediate line NU2 connecting between the U-phase grid protection switch RCU2 and the U terminal of the inverter 11, and the other terminal connected to the first load terminal TR1. The U-phase protection switch RCU4 has one terminal connected to the U-phase intermediate line NU3 connecting between the U-phase grid protection switch RCU2 and the U terminal of the grid-side terminal unit 12, and the other terminal connected to a line NR2 connecting between the U-phase protection switch RCU3 and the first load terminal TR1.

In the configuration of FIG. 9, the controller 14 may control each switch RC so as to cause the conducting path corresponding to the operation state of the power converter 10 and the power supply state of the grid 4 to conduct. Specifically, in (3) During Disconnection of Inverter (Load Compatible with 200 V), the U-phase grid protection switch RCU2, the U-phase protection switch RCU3, the first voltage switch RCS1, the second voltage switch RCS2, and the W-phase grid protection switch RCW2 are turned off to disconnect the inverter 11 from the grid 4. On the other hand, the U-phase protection switch RCU4 and the W-phase protection switch RCW3 are caused to conduct to connect the grid 4 and the load-side terminal unit 13 together. In (4) During Disconnection of Inverter (Load Compatible with 100V), the U-phase grid protection switch RCU2, the U-phase protection switch RCU3, the first voltage switch RCS1, the W-phase grid protection switch RCW2, and the W-phase protection switch RCW3 are turned off to disconnect the inverter 11 from the grid 4. On the other hand, the U-phase protection switch RCU4, and the second voltage switch RCS2 are caused to conduct to connect the grid 4 and the load-side terminal unit 13 together. In (5) During Grid Independent Operation, the U-phase grid protection switch RCU2, the U-phase protection switch RCU4, the second voltage switch RCS2, the W-phase grid protection switch RCW2, and the W-phase protection switch RCW3 are turned off to disconnect the inverter 11 from the grid 4. On the other hand, the U-phase protection switch RCU3 and the first voltage switch RCS1 are caused to conduct to connect the inverter 11 and the load-side terminal unit 13 together. In (1) During Normal Operation (Load Compatible with 200 V), and (2) During Normal Operation (Load Compatible with 100 V), each switch RC may be controlled as in the above embodiment or as in FIG. 8, and thus, its specific description will be omitted. At that time, the R-phase protection switches RCU3 and RCU4 may be operated just like the U-phase output protection switch RCU1 does.

In the above embodiment, the grid independent operation unit is configured as the independent load 5. However, this is only an exemplary embodiment of the present disclosure. Specifically, the grid independent operation unit may receive a power supply from the power converter 10 in the grid independent operation, and its configuration is not particularly limited. For example, the grid independent operation unit may be a connection destination for connecting a desired load in the grid independent operation like an independent outlet.

In the above embodiment, the distributed power supplies 2, 2, . . . , include the plurality of photovoltaic power generators 21, 21, . . . , and the storage battery 22. However, this is only an exemplary embodiment of the present disclosure. For example, the distributed power supply 2 may be the photovoltaic power generator 21 or the storage battery 22. The distributed power supply 2 may also be other distributed power supply other than the photovoltaic power generator 21 and the storage battery 22 (for example, wind power generators).

Figure 10:
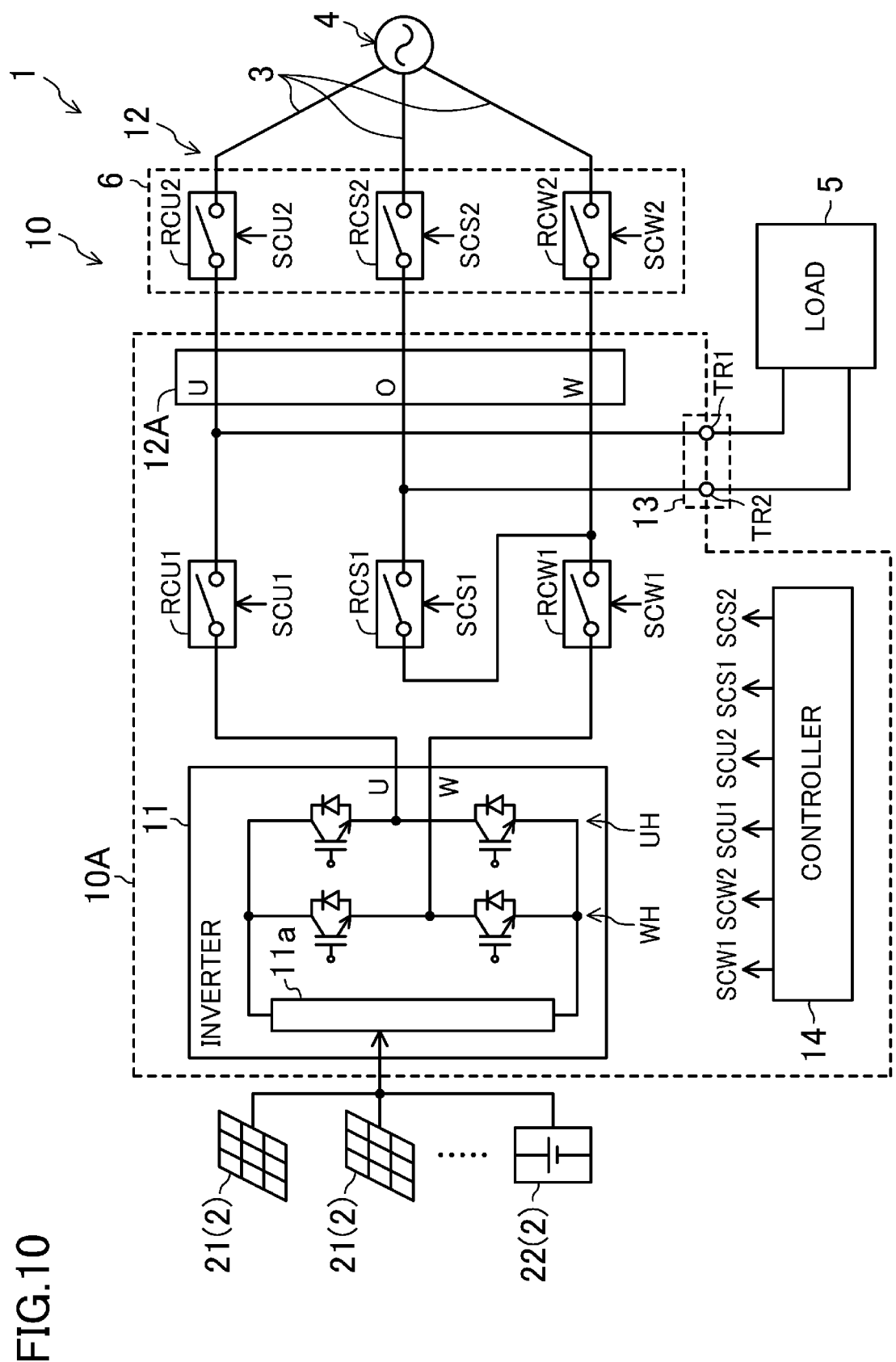
FIG. 10 illustrates another exemplary overall configuration of the distributed power supply system according to the embodiment.

Also, as shown in FIG. 10, the switches RCU1 and RCW1 for protecting the output of the inverter 11 and the switches RCU2 and RCW2 for protecting the grid may be configured independently. An example of such a configuration is a case where a power conditioner 10A provided with the switches RCU1 and RCW1 for protecting the output of the inverter 11, a panel board 6 provided between the power conditioner 10A and the grid 4, and other components constitute the power converter 10. In such a case, a connection terminal unit 12 of the power converter 10 is disposed closer to the grid 4 of the panel board 6.

In FIG. 10, the reference character 12A indicates a grid-side terminal unit of the power conditioner 10A. FIG. 10 shows an example in which the power conditioner 10A is provided with the first voltage switch RCS1, and the panel board 6 is provided with the second voltage switch RCS2. In FIG. 10, the first and second voltage switches RCS1 and RCS2 may be collectively provided to the power conditioner 10A or the panel board 6.

Figure 11:
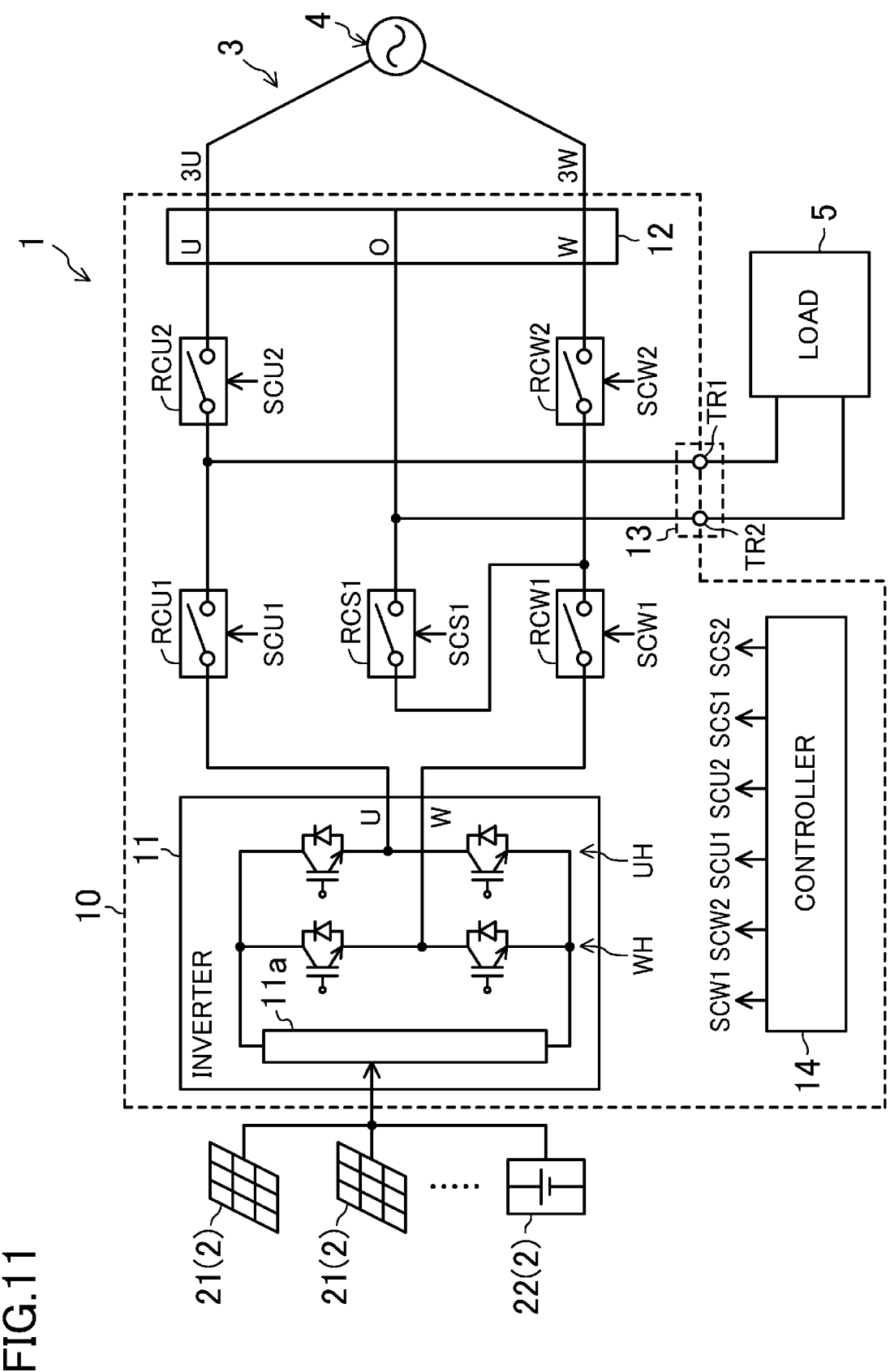
FIG. 11 illustrates another exemplary overall configuration of the distributed power supply system according to the embodiment.

In the above embodiment, the grid 4 is supposed to be a single-phase three-wire grid. Alternatively, the power converter 10 according to the embodiment can be connected to a single-phase two-wire grid 4. FIG. 11 shows an example in which the power converter 10 according to the above embodiment is connected to the single-phase two-wire grid 4. As shown in FIG. 11, the U terminal of the grid-side terminal unit 12 is connected to a U-phase line 3U of the transmission line 3, and the W terminal of the grid-side terminal unit 12 is connected to a W-phase line 3W of the transmission line 3. The controller 14 may control each switch RC so as to cause the conducting path corresponding to the operation state of the power converter 10 and the power supply state of the grid 4 to conduct. As can be seen, the power converter 10 according to the embodiment can be connected to both a single-phase three-wire grid and a single-phase two-wire grid. The O-terminal of the grid-side terminal unit 12 may be connected to no element and no terminal or may be connected to, e.g., ground. The second voltage switch RCS2 may be omitted, and FIG. 11 shows an example where the second voltage switch RCS2 is omitted.

A power converter according to one aspect of the present disclosure includes: an inverter converting DC power to AC power and outputting the AC power to a pair of first and second lines; a connection terminal unit having a first voltage terminal connected to the first line, a second voltage terminal connected to the second line, and a neutral terminal; a first protection switch disposed in the first line; a second protection switch disposed in the second line; first and second voltage switches connected together in series between the second line and the neutral terminal; and load connection terminals, one of which is connected to the first line, and the other of which is connected to a line connecting the first and second voltage switches together.

The term "load connection terminal" includes an terminal connected to a load exclusive to the grid independent operation or a load corresponding to a grid independent operation (hereinafter generally referred to as "an independent load"), and a terminal, such as an independent outlet, for a terminal separated from a grid. The term "terminal" includes a terminal comprised of a single electronic component, a terminal formed in, e.g., a circuit substrate, or a connection portion, such as a circuit substrate, connecting an interconnect.

According to this configuration, if the power converter is connected to the grid, one of the first voltage switch or the second voltage switch is controlled to be on, and the other switch is controlled to be off. This can supply different voltages to the load connection terminal from the grid. For example, the grid to which the power converter is connected is a single-phase three-wire grid (the supply voltage from the grid is 100 V or 200 V), the voltage of 100 V or the voltage 200 V can be selectively supplied. Also, during, e.g., power failure, if the power converter is disconnected from the grid, of the first and second voltage switches, a grid independent operation can be performed in which the switch closer to the converter is controlled to be on, and the switch closer to the grid is controlled to be off to supply an electric power from the inverter to the load connection terminals. That is to say, the controller controls the switches such that the inverter is connected to different voltages (for example, 100 V or 200 V) all the time during the grid interconnection, and the controller also controls the switches such that the inverter performs the grid independent operation during, e.g., power failure. Further, the conducting path supplying an electric power from the grid to the load connection terminal, and the conducting path supplying an electric power from the inverter to the load connection terminal share the voltage switch. Likewise, at least two conducting paths of the plurality of conducting paths allowing the inverter to be connected to different voltages (100 V or 200 V) all the time during the grid interconnection, and the inverter to perform the grid independent operation during power failure share the first and second protection switches. This can reduce the number of switches for use. In addition, this can simplify the configuration for detecting failure such as a failure detection circuit and processes for detecting failure.

A power converter according to one aspect of the present disclosure includes: an inverter converting DC power to AC power; a connection terminal unit having a first voltage terminal, a second voltage terminal, and a neutral terminal; a pair of load connection terminals; switches disposed in first to fourth conducting paths; and a controller controlling each of the switches, wherein the switches include a shared switch shared by at least two conduction paths of the first conducting path, the second conducting path, the third conducting path, or the fourth conducting path.

The first conducting path connects between one output of the inverter and the first voltage terminal of the connection terminal unit and between the other output of the inverter and the second voltage terminal of the connection terminal unit. The second conducting path connects one output of the inverter and the one of the load connection terminals and between the other output of the inverter and the other of the load connection terminals. The third conducting path connects between the first voltage terminal of the connection terminal unit and the load connection terminal and between the second voltage terminals of the connection terminal unit and the load connection terminal. The fourth conducting path connects between the first voltage terminal of the connection terminal unit and the load connection terminal and between the neutral terminal and the load connection terminal.

The term "conducting path" refers to a current path, and complemented as a conductor line. Parts of the plurality of conducting paths may be the same or common line.

For example, the power converter may include a first common line common to the first conducting path and the second conducting path, and the first common line may be provided with a grid protection switch used in both the first conducting path and the second conducting path. The protection switch may include a second common line common to the first conducting path and the fourth conducting path, and the second common line may be provided with an output protection switch.

According to the above embodiment, the switch is provided to the first to fourth conducting paths, and thus, in a situation where the power converter is connected to a grid or where the operation of the power converter is stopped, a selection can be made between a selective voltage supply (for example, selecting between 100 V and 200 V) from the grid to the load connection terminals and a grid independent operation based on the output voltage from the inverter.

Further, the plurality of conducting paths share the shared switches, and thus, the number of switches for use can be used. This can simplify the configuration for detecting failure such as a failure detection circuit and processes for detecting failure.

A distributed power supply system according to one aspect of the present disclosure includes a distributed power supply; the power converter of one of the above aspects, the power converter receiving electric power output from the distributed power supply as the DC power; and a grid independent operation unit connected to the load connection terminals.

A distributed power supply system according to one aspect of the present disclosure is connected to a single-phase three-wire grid, and includes: a distributed power supply; an inverter converting DC power output from the distributed power supply to AC power, and outputting the AC power to a pair of first and second lines connected to first and second voltage lines of the grid; a first protection switch disposed in the first line; a second protection switch disposed in the second line; first and second voltage switches connected together in series between the second line and a neutral line of the grid; and a grid independent operation unit having one terminal connected to the first line, and the other terminal connected to a line connecting the first and second voltage switches together.

The distributed power supply system according to these aspects, just like the first and second aspects, in a situation where the power converter is connected to a grid or where the operation of the power converter is stopped, a selection can be made between a selective voltage supply (for example, selecting between 100 V and 200 V) from the grid to the load connection terminals and a grid independent operation based on the output voltage from the inverter. On top of that, the number of switches for use can be reduced. This can simplify the configuration for detecting failure such as a failure detection circuit and processes for detecting failure.

According to the present disclosure, in addition to the first and second protection switches, the first and second voltage switches are connected in series between the second line and the neutral terminal of the connection terminal unit. This can supply different voltages from a grid to a load connection terminal, and enables a grid independent operation. Further, the plurality of conducting path share switches, and thus, the necessary number of switches can be reduced.

The present disclosure can provide a power converter capable of performing a grid independent operation and having switches with improved configurations. Such a device is extremely useful as a distributed power supply system in which a plurality of distributed power supplies are connected to a utility power grid.

What is claimed is:

1. A power converter comprising:
    an inverter converting DC power to AC power and outputting the AC power to a pair of first and second lines;
    a connection terminal unit having a first voltage terminal connected to the first line, a second voltage terminal connected to the second line, and a neutral terminal;
    a first output protection switch and a first grid protection switch connected together in series between the inverter and the first voltage terminal in the first line;
    a second output protection switch and a second grid protection switch connected together in series between the inverter and the second voltage terminal in the second line;
    first and second voltage switches connected together in series between a line connecting the second output protection switch to the second grid protection switch and the neutral terminal;
    load connection terminals, one of which is connected to a line connecting the first output protection switch to the first grid protection switch, and the other of which is connected to a line connecting the first and second voltage switches together; and
    a controller controlling each of the switches.

2. The power converter of claim 1, wherein
    the controller controls each of the switches such that one of the first voltage switch or the second voltage switch is caused to conduct and the other is interrupted.

3. A power converter comprising:
    an inverter converting DC power to AC power;
    a connection terminal unit having a first voltage terminal, a second voltage terminal, and a neutral terminal;
    a pair of load connection terminals;
    switches including:
        a first switch disposed in a first conducting path between one output of the inverter and a first voltage terminal of the connection terminal unit;
        a second switch disposed in the first conducting path between the other output of the inverter and a second voltage terminal of the connection terminal unit;
        a third switch disposed in a second conducting path between the first voltage terminal of the connection terminal unit and one of the load connection terminals, wherein the first switch and the third switch are connected together in series between the one output of the inverter and the first voltage terminal of the connection terminal unit;

a fourth switch disposed in the second conducting path between the second voltage terminal of the connection terminal unit and the other of the load connection terminals;

a fifth switch disposed in a third conducting path between the neutral voltage terminal of the connection terminal unit and the other of the load connection terminals; and a sixth switch disposed in a fourth conducting path between the other output of the inverter and the other of the load connection terminals; and a controller controlling each of the switches, wherein at least one of the first, second, third, fourth, fifth, or sixth switches is a shared switch shared by at least two conduction paths of the first conducting path, the second conducting path, the third conducting path, or the fourth conducting path.

4. The power converter of claim 3, further comprising a first common line shared by the first conducting path and the second conducting path, wherein the first common line includes the third switch or the fourth switch comprising a grid protection switch as the shared switch.

5. The power converter of claim 3, further comprising a second common line shared by the first conducting path and the fourth conducting path have a second common line, wherein the second common line includes the first switch or the second switch comprising an output protection switch as the shared switch.

6. A distributed power supply system comprising:

a distributed power supply;

a power converter to receive electric power output from the distributed power supply as DC power, the power converter comprising:

an inverter converting DC power to AC power and outputting the AC power to a pair of first and second lines;

a connection terminal unit having a first voltage terminal connected to the first line, a second voltage terminal connected to the second line, and a neutral terminal;

a first output protection switch and a first grid protection switch connected together in series between the inverter and the first voltage terminal in the first line;

a second output protection switch and a second grid protection switch connected together in series between the inverter and the second voltage terminal in the second line;

first and second voltage switches connected together in series between a line connecting the second output protection switch to the second grid protection switch and the neutral terminal;

load connection terminals, one of which is connected to a line connecting the first output protection switch to the first grid protection switch, and the other of which is connected to a line connecting the first and second voltage switches together; and a controller controlling each of the switches; and a grid independent operation unit connected to the load connection terminals.

7. A distributed power supply system connected to a single-phase three-wire grid, the distributed power supply system comprising:

a distributed power supply;

an inverter converting DC power output from the distributed power supply to AC power, and outputting the AC power to a pair of first and second lines connected to first and second voltage lines of the grid;

a first output protection switch and a first grid protection switch connected together in series in the first line between the inverter and the first voltage line of the grid;

a second output protection switch and a second grid protection switch connected together in series in the second line between the inverter and the second voltage line of the grid;

first and second voltage switches connected together in series between a line connecting the second output protection switch to the second grid protection switch and a neutral line of the grid; and a grid independent operation unit having one terminal connected to the first line, and the other terminal connected to a line connecting the first and second voltage switches together.

* * * * *